(12) United States Patent
Appleyard et al.

(10) Patent No.: US 9,557,007 B2
(45) Date of Patent: Jan. 31, 2017

(54) IMAGING AND SAFETY SYSTEM AND METHOD FOR AN INDUSTRIAL MACHINE

(71) Applicant: Lazer Safe Pty Ltd, Malaga, W.A. (AU)

(72) Inventors: Robert Meredith Appleyard, Cottesloe (AU); Dimitre Stantchev Stanev, East Perth (AU); Paul Gould, Darch (AU)

(73) Assignee: Lazer Safe Pty Ltd, Malaga (AU)

( * ) Notice: Subject to any disclaimer, the term of this patent is extended or adjusted under 35 U.S.C. 154(b) by 310 days.

(21) Appl. No.: 14/243,556

(22) Filed: Apr. 2, 2014

(65) Prior Publication Data

US 2014/0293039 A1 Oct. 2, 2014

Related U.S. Application Data

(63) Continuation of application No. 12/780,070, filed on May 14, 2010, now Pat. No. 8,692,877, which is a continuation of application No. 11/993,200, filed as application No. PCT/AU2006/000859 on Jun. 20, 2006, now abandoned.

(30) Foreign Application Priority Data

Jun. 20, 2005 (AU) ................................. 2005903214

(51) Int. Cl.
*H04N 7/18* (2006.01)
*F16P 3/14* (2006.01)
*B21D 55/00* (2006.01)
*B30B 15/28* (2006.01)

(52) U.S. Cl.
CPC ............... *F16P 3/142* (2013.01); *B21D 55/00* (2013.01); *B30B 15/28* (2013.01); *F16P 3/14* (2013.01); *F16P 3/144* (2013.01)

(58) Field of Classification Search
CPC .................................. G06K 9/00; H04N 5/222
USPC ............................. 348/80–140; 382/127–155
See application file for complete search history.

(56) References Cited

U.S. PATENT DOCUMENTS

| | | |
|---|---|---|
| 4,550,586 A | 11/1985 | Aubert et al. |
| 4,564,765 A | 1/1986 | Blaich |
| 4,772,801 A | 9/1988 | Fornerod et al. |

(Continued)

FOREIGN PATENT DOCUMENTS

| | | |
|---|---|---|
| DE | 10112200 | 10/2002 |
| EP | 0141677 | 5/1985 |

(Continued)

*Primary Examiner* — Andy Rao
(74) *Attorney, Agent, or Firm* — Crawford Maunu PLLC

(57) ABSTRACT

An imaging system, safety system or combined imaging and safety system includes a light transmitter and a corresponding receiver. Image data relating to a machine tool and/or workpiece is derived and processed to determine information regarding the tool and/or tool position and/or extent of work carried out on the workpiece. A screen, such as a shadow screen, can be used to form an image of a profile of the tool tip and end of the workpiece. Tool tip position and extent of work on the workpiece can be derived from the image. Certain aspects are directed to a safety system application for halting a machine or tool when a light beam is interrupted, and can provide progressive muting of beam interruption detection, such as by systematically disregarding or muting signals from rows of receiver array elements as the beam passes through a mute point ahead of a tool.

20 Claims, 7 Drawing Sheets

(56) References Cited

U.S. PATENT DOCUMENTS

| | | | |
|---|---|---|---|
| 5,531,087 A | 7/1996 | Kitabayashi et al. | |
| 5,899,964 A | 5/1999 | Ooenoki et al. | |
| 7,034,929 B2 | 4/2006 | Bergbach et al. | |
| 7,406,189 B2 * | 7/2008 | Ganz | C30B 7/00 348/131 |
| 2002/0145103 A1 | 10/2002 | Bernardini et al. | |
| 2005/0235790 A1 | 10/2005 | Dieterle et al. | |
| 2006/0126233 A1 | 6/2006 | Braune et al. | |

FOREIGN PATENT DOCUMENTS

| | | |
|---|---|---|
| EP | 0412956 | 2/1991 |
| EP | 1387121 | 2/2004 |
| JP | 05-154561 A | 6/1993 |
| JP | 07-031106 A | 1/1995 |
| JP | 2004-174500 A | 6/2004 |
| JP | 2008-517268 | 1/2012 |
| WO | WO8704259 | 7/1987 |
| WO | WO9621529 | 7/1996 |
| WO | WO0067932 | 11/2000 |
| WO | WO03080268 | 10/2003 |
| WO | WO2004079225 | 9/2004 |

\* cited by examiner

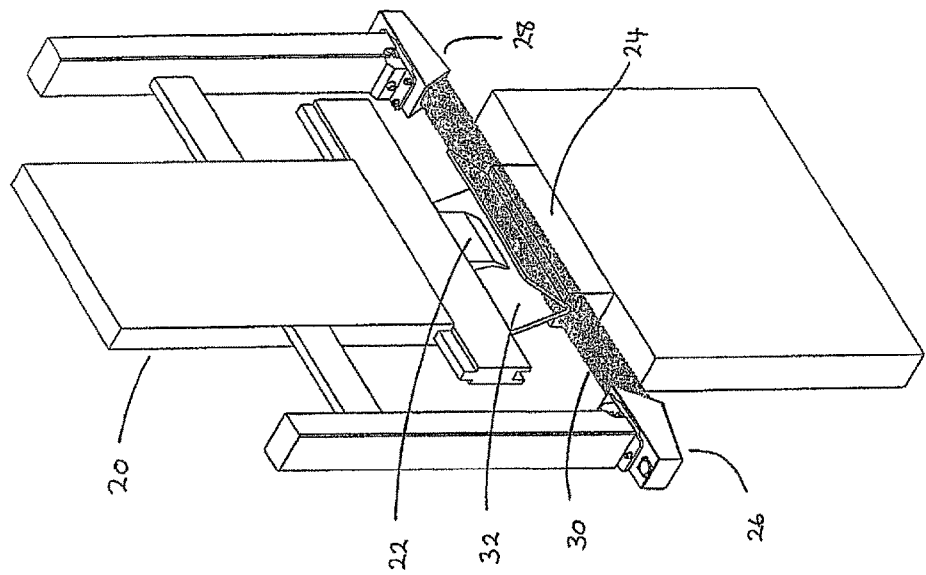
FIG. 6
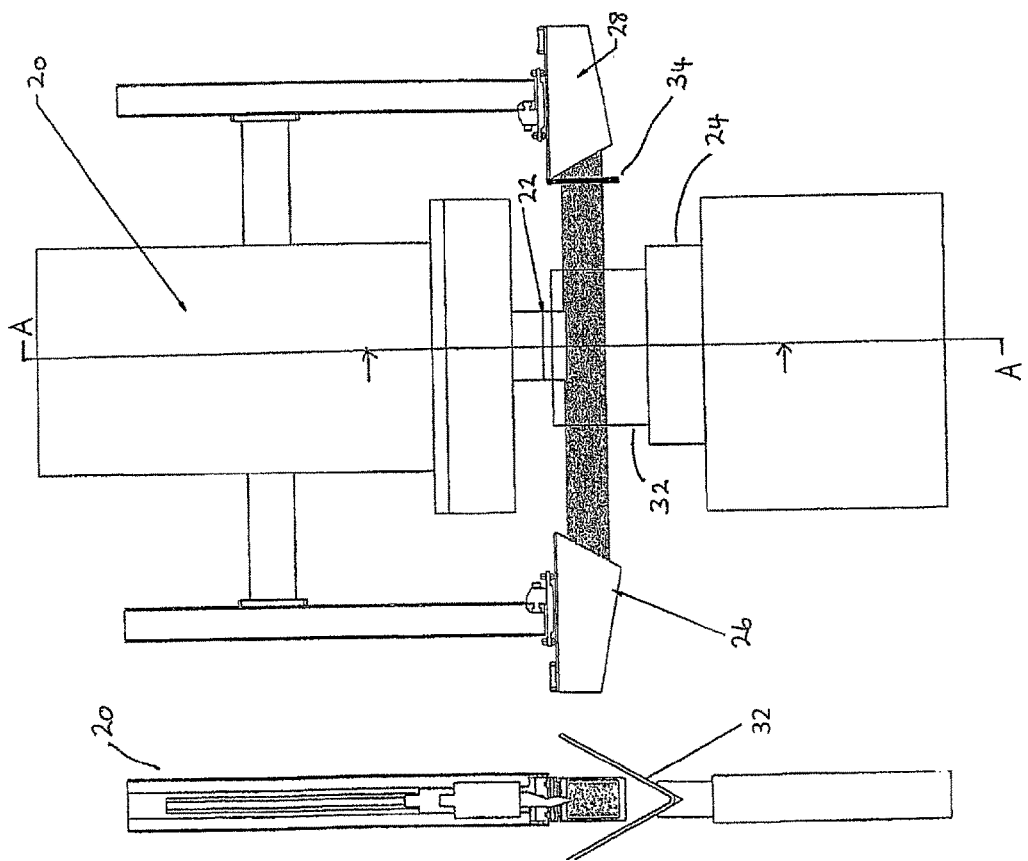
FIG. 7
FIG. 8

IMAGING AND SAFETY SYSTEM AND METHOD FOR AN INDUSTRIAL MACHINE

RELATED PATENT DOCUMENTS

This patent document is a continuation under 35 U.S.C. §120 of U.S. patent application Ser. No. 12/780,070 filed on May 14, 2010 (U.S. Pat. No. 8,692,877); which is further a continuation of U.S. patent application Ser. No. 11/993,200 filed on Dec. 19, 2007 (abandoned); which is the national stage filing under 35 U.S.C. §371 of International Application No. PCT/AU2006/000859 filed on Jun. 20, 2006; which claims foreign priority benefit under 35 U.S.C. §119/365 of Australian Patent Application No. 2005903214 filed on Jun. 20, 2005, each of which (including any Appendices or other materials related thereto) is fully incorporated herein by reference.

FIELD OF THE INVENTION

The present invention is generally directed to a light beam system and method applicable to an industrial machine. In particular, the present invention relates to a light beam safety system and also to a system for automatically determining the status of material being worked by the industrial machine, such as industrial presses, press brakes or guillotines, and also industrial lathes, such as CNC lathes. Although the present invention will now be described with respect to press brakes for ease of understanding, it is to be appreciated that other applications of the present invention, such as on milling and turning machines, CNC machines and presses in general, are also envisaged to fall within the scope and ambit of the present invention.

BACKGROUND OF THE INVENTION

The Applicant has previously developed safety systems for industrial presses utilizing one or more light sources, each emitting a single continuous planar laser beam having a generally constant lateral width, and a light receiver for each beam. A single beam safety system is described in Australian patent number 738619, and a multiple beam system is described in Australian patent application number 2003215410, both of which are incorporated herein by reference. In such systems, both the light source(s) and the light receiver(s) are mounted on the moveable section of the industrial press. In the case of a press brake, the light source(s) and light receivers are mounted for movement with the moveable tool, and the tool (and the laser and light receivers mounted thereon) move relative to a stationary anvil or die section supporting a piece of sheet material to be bent by the tool. An example of such a safety system is described in International Patent Application No. PCT/AU00/00420, details of which are incorporated herein by reference. Especially when bending sheet materials using press brakes, the accuracy of the bending angle which is obtained depends, firstly, on the characteristics of the sheet, such as its thickness, which may vary from one sheet to another, and its physical and geometrical characteristics, on which the elastic return of the sheets depends. Furthermore, characteristics of the press itself, especially tolerance in the construction of the machine and tooling and wear on the tools, and also defamations appearing in the press at the instance of bending can also play a part in the bending angle.

Arrangements have previously been proposed to permit instantaneous automatic control of the bending operation in respect of the piece of material to be bent, so as to obtain, automatically and exactly, the desired bending angle of the material, while avoiding any manual intervention before and during the bending. Such automatic systems alleviate the need for manual adjustment and/or observation.

One such prior art automatic system is disclosed in U.S. Pat. No. 4,564,765, which proposes an opto-electronic measuring method and an apparatus for measuring material defamations in processing machines, particularly of the bending angle in free-bending die presses. This arrangement proposed one or two light spots produced on the deforming surface of the material, such as the bending side of a sheet metal plate, using a laser, infra-red emitting diode or the like, directed at an acute angle to the underside of the sheet material to be bent. The distance covered by the light spot, and the distance of the light spots from one another, respectively, are received by means of a photo detector, e.g., a diode line camera, which is set up at a distance and approximately perpendicular to the light spot or spots, and the measured values are compared with the index value in a microprocessor, e.g., by means of the control of the emotion depth of the bending die. At least one light source is arranged to strike the underside of the sheet metal plate at an angle relative to the bending axis. If the sheet metal plate is bent, the light spot appears to travel along the underside of the material. A sensor detects the extent of travel of the light spot and the resulting bending angle of the material can be determined form the displacement of the light spot relative to its starting position. However, such a system is limited in application to the bending of sheet material, and the accuracy of the determined angle of bend decreases with increasing bend angle due to the apparent travel of the light spot decreasing as the material is bent.

An alternative system has previously been proposed in U.S. Pat. No. 4,772,801. This patent discloses a light beam device for automatically controlling the bending operation when bending the press brake. The device includes an emitter mounted on one side of the press adapted to produce a large diameter light beam directed parallel to the bending axis of the work piece to be bent, i.e., along the length of the work piece to be bent, and the receiver including a box including a screen drilled with a plurality of holes arranged to form a plurality of light beams of small diameters. The box comprises a deflecting means intended to deflect the light beams onto a system of photo diodes arranged on the axis of rotation of a rotating motor and angle encoder. A micro coordinator is connected to the photo diodes and to the angle encoder, and permits the determination of the instantaneous bending angle of the work piece, and also makes possible determination of the speed of descent of the tool. However, aforesaid arrangement has limited application in needing to be attached to the lower table of a press and requires relatively complex moving parts and having a prism mounted for rotation about the axis of the image analyser. Furthermore, the accuracy of flexibility of measurement of the bend angle of the material is limited by the number of holes, and the separation distance between adjacent holes in a radial direction of the encoder from the axis of rotation, such that error in the determination of the bend angle can be significant.

An alternative system is disclosed in U.S. Pat. No. 4,550,586. This patent discloses a device employing a number of detectors mounted at a level of the upper surface of the die of an industrial press. The purpose of the detectors is to signal to a numerical control the moment a portion of a sheet of material to be bent begins to rise from the upper surface of the die, i.e., during bending. The device allows automatic determination of the thickness of the sheet and the area where the bend is to be located during the course of forming a bend. The thickness of the sheet can then be used by the numerical control system to correct the travel of the tool, without interrupting the forming cycle, in such a way as to obtain, with high precision, the required bend angle of the sheet material. However, with the detectors lying level with and adjacent to the upper surface of the die, such detectors are prone to damage or being accidentally obscured during bending operations and impeding and slowing down the loading and unloading of work pieces, e.g., sheets of metal.

Many industrial machines, including press brakes, utilise a safety light beam system that will stop the machine operating if the safety beam is interrupted prior to a mute point, but will disable this stopping function after the mute point. Utilising machine operating speed up to the mute point is therefore important for productivity, whilst still needing to be able to stop the machine within sufficient travel distance to prevent injury to an operator. Thus, many machines are operated at high speed up to the mute point in order to maximise efficiency and productivity, and at a slower operating speed after the mute point.

For many safety systems that utilise either a single or multiple beams, operation is much the same. Interruption of one or more beams stops the machine. However, for broad or multi beam applications, i.e., light beams having a broad 2 dimensional cross section (depth and height) in the order of centimeters or multiple beams effectively providing a broad safety zone, the tool tip may be several millimeters or centimeters away from the mute point when the first portion of the beam ahead of the tool tip reaches the mute point. In such scenarios, the machine would switch to slow speed because the broad beam has reached the mute point. This may lead to lost efficiency or productivity.

It would therefore be beneficial to provide a light beam safety system for an industrial machine that could recognise that part of the light beam had reached or passed the mute point and determine the required stopping distance.

With the aforementioned in view, it is one object of the present invention to provide a device for determining the progress of working of a selected piece of material whilst alleviating one or more of the problems of the aforementioned prior art.

It is a subordinate object of the present invention to provide an imaging device for determining an angle of bend of sheet material in an industrial press which allows constant determination of the angle of bend.

A further object of the present invention is to provide a safety beam system for a press brake which provides an adaptable broad beam protection zone to help maintain efficiency and productivity.

SUMMARY OF THE INVENTION

With the above mentioned in mind, one form of the present invention provides an imaging system for an industrial machine including at least one light transmitter for mounting to a first portion of the industrial machine, said at least one transmitter including means to transmit a substantially collimated beam of light to a receiver, said receiver including at least one pixel matrix arranged to receive at least a portion of said beam, said receiver including output means to output image data, and an image processing means arranged to receive and process said output image data, wherein, in use, said receiver outputs to the image processing means image data relating to a pattern of said beam attenuated by said work piece and the remaining portion of said beam, and wherein said image processing means determines the extent of work carried out on said work piece by said tool based on said image data.

Thus, advantageously, the present invention permits determination of the extent of work carried out on a work piece by an industrial machine whilst alleviating the need for manual intervention before and/or during working of the work piece.

Another form of the present invention provides an imaging system for automatically determining an extent of work carried out on a work piece by a tool of an industrial machine, said system including a light transmitter for mounting to a first portion of the industrial machine, said transmitter including:

at least one light source and means to transmit a substantially collimated beam of said light to a receiver;

a receiver for mounting to a second portion of the industrial machine, said receiver including an image information capture means and a captured image information output means; and an image processing means arranged to receive and to process said output captured image information into image data;

wherein said system is arranged such that said work piece, when illuminated by said beam, attenuates a portion of said beam transmitted to said image capture means, said receiver being arranged to output to the image processing means captured image information relating to the portion of said beam attenuated by said work piece and the remaining portion of said beam, and wherein said image processing means determines the extent of work carried out on said work piece by said tool to create image data.

Thus, such an advantageous form of the present invention also permits determination of the extent of work carried out on a work piece by an industrial machine whilst alleviating need for manual intervention before and/or during the working of the work piece.

Another form of the present invention provides an imaging system for an industrial machine, said system including a light transmitter including means to transmit a substantially collimated beam of light to a receiver, said receiver including an image plane arranged to display an image formed by attenuation of at least a portion of the beam when illuminating the work piece and/or tool interposing between the transmitter and plane, image capture means arranged to interpret and convert said image into image data, and image data processing means arranged to determine from said image data an extent of work carried out on said work piece by said tool and/or a profile of said tool based on said image data.

Preferably, the light transmitter includes at least one light source, such as one or more laser diodes, and more preferably may include a lens system for focussing and/or collimating the beam(s). For example, the transmitter may include a lens arrangement for spreading and focussing light into one or more wide fan or planar (say horizontal) beams and then a subsequent section to form the resultant beam into a broad X-section beam by spreading the fan or planar beam(s) into one or more beams having substantial height and width in 2 dimensions e.g., 50 mm×50 mm X-section.

Preferably the receiver includes one or more image screens for capturing or resolving the image. Thus the image plane may include one or more screens, such as shadow screens. Alternatively or in addition, the image plane may include one or more cameras for directly imaging the received portion of the beam. Such cameras would include the image capture means, and preferably may include the image processing means.

Preferably the image plane may include one shadow screen arranged to form a shadow image created by the pattern of light falling on said screen e.g., pattern formed by a combination of attenuated and un-attenuated light. It will be appreciated that the work piece and/or tool may completely attenuate a portion of the beam. That is, they completely block light illuminating them from reaching the image plane.

A further form of the present invention provides a combined safety and imaging system for an industrial machine, including at least one light transmitter including means to transmit at least one substantially collimated beam of light to a receiver, wherein, up to a mute point, said system is configured to provide at least a safety mode which halts an operation of said machine when an object intersects at least one said beam, and from said mute point, said system is configured to provide at least an imaging mode, wherein said receiver receives a pattern of light created by attenuation of at least a portion of at least one said beam illuminating a work piece and/or tool interposing between the transmitter and receiver, said system including image capture means arranged to interpret and convert said pattern into image data, and image data processing means arranged to determine from said image data an extent of work carried out on said work piece by said tool and/or a profile of said tool based on said image data.

Thus, as the tool of the machine, such as a tool of a press brake or lathe, commences an operational movement, the system may initially be in safety mode until a pre-determined mute point is reached. From the mute point, the system may change over to, or initiate, an imaging mode which is utilised to determine the progress of work carried out on a work piece (e.g., degree of bend of sheet metal) and/or to determine whether a tool is the correct tool (compared to a library of stored data) or is working/positioned correctly. Preferably the safety system is switched off at the mute point and the imaging mode switched on. In this way, duplication of components may be minimised by utilising the same transmitter(s) and/or receivers for both the safety system and imaging modes.

The mute point is generally determined as the point at which the safety system is no longer practical or prescribed, usually due to the tool being sufficiently proximate to the work-piece that an object is highly unlikely to be able to interpose between the tool and work-piece and therefore the risk of injury to a user is extremely low or negligible.

Preferably, the industrial machine may be a press brake. However, whilst a press brake is a preferred form of industrial machine for application of the imaging system according to the present invention, other machines are considered to fall within the scope and ambit of the present invention where a work piece is subject to working by a tool. For example, lathes such as CNC lathes, milling machines, industrial presses, and other bending and forming machines. Furthermore, it will be appreciated that the present invention is applicable to machines for working a variety of material such as metal or plastics.

Preferably, the receiver e.g., the image capture means, may include at least one pixel matrix. One or more of said pixel matrices may be of megapixel resolution or any other suitable matrix size e.g., 640×480 array of pixels. However, other array sizes of matrixes may be utilised. For example, one or more charge coupled devices; (CCD) may be utilized to form a pixel matrix. More preferably, multiple pixel matrixes may be utilized and, even more preferably, the received beam may be split into multiple resultant beams each to be received by a separate pixel matrix. Thereby, preferably, redundancy may be designed into the system by providing multiple receivers and/or multiple pixel matrixes in one or more of the receivers.

Preferably, the image capture means may be a screen, preferably of a translucent or semi-translucent material, such as a shadow screen, whereby image information may be captured following attenuation of part of the beam, and the image information thereafter processed into image data. Preferably, the receiver comprises one or more cameras which may view the captured image information, e.g., image information on a screen, and therefrom the image data may be determined.

Preferably, the transmitter and receiver may be mounted for travel with a moving portion of a press brake, such as a working tool with a down-stroke press brake. That is, an industrial press may for example be a press brake having a blade and an anvil moveable relative to each other. A beam may be emitted immediately adjacent the leading edge of the blade. According to one possible arrangement, the beam may be horizontal and located so as to be transmitted between the blade and the anvil of the press brake.

The light transmitter may include an actual light source, e.g., a laser source, or may be taken as a device at which point the light is actually transmitted from a light providing device, such as a lens assembly, towards the workpiece.

The transmitted beam may have a circular or polygonal cross section, provided the beam is capable of illuminating a suitable area at the image capture means. Preferably, the cross section of the beam is sufficiently large to illuminate a required number of pixels in the matrix.

The light emitter may preferably include a laser emitter, for example, a laser diode for emitting a laser beam, and a lens assembly for varying the configuration of the laser beam emitted by the laser diode. Multiple emitting means may be used, such as multiple laser diodes. Laser beams emitted by such laser emitters, when focussed, may be typically circular/spot in cross section are typically circular in cross section. One or more lens assemblies may be utilized to convert a circular laser beam into a beam having a larger circular cross section, for example, 40-50 mm diameter, or alternatively, a polygonal cross section, e.g., square or rectangular. A cross section of such beams is generally formed as an expanded and collimated beam of greater cross section than the originating light source, so as to provide a monitoring zone, e.g., imaging zone, having a relatively broad diameter or width, thereby providing a monitoring zone of cross section larger in two dimensions than a prior art spot or planar beam. The cross section of the beam(s) e.g., of a "block" laser, may be reduced or focussed to a smaller size e.g., by a lens arrangement, prior to illuminating a receiver e.g., pixel array, shadow screen or other receiving device. It should be noted that some dispersion of the collimated beam may occur the further away a point on the beam is from the emitter. This dispersion is however relatively insignificant within the range of distances that the beam must be emitted over, typically between 2-12 meters.

Preferably, the system is used to illuminate an end of a sheet of material to be bent by a bending press. The material may be metal or, alternatively, or in combination, other material such as plastic.

The imaging system may be combined with a safety system for the machine. For example, the light emitter may be a laser emitting means and the receiver may be a laser light receiving means both mountable on the blade of a press brake, and may move with the blade if that part is the moveable section of the press brake. Where an object close enough to the blade intersects the laser beam, the blade will stop or prevent operation or further operation of the press. The beam may be a continuous planar laser beam having a generally constant lateral width such that the beam can cover a relatively wide area when compared with a conventional point laser beam, whilst at the same time ensuring that there are no "spaces" through which an object can pass without detection.

Alternatively, multiple planar laser beams may be envisaged, such as, a vertical series of horizontal planar laser beams and/or vertical planar laser beams aligned in a horizontal series. As the tool progresses towards the work piece, an object intersecting one or more of the beams will stop or prevent operation of the machine. Preferably, when the tool reaches a mute point, the system changes over from a safety system to the imaging system. Thereby, conveniently and advantageously, the imaging system according to one or more forms of the present invention can be utilized to also serve as a safety system for the machine. Thus, duplication of components may be avoided, and in addition, productivity of the machine may be increased due to the reduced reliance upon multiple systems and respective data for those systems to be calculated.

In regard to bending of materials, e.g., metal sheet in a press brake, the imaging system may be used to image an end profile of the metal sheet being bent. As the tool progressively bends the metal sheet into a V shape in combination with the anvil or die, the imaging system may be utilized to determine the increasing or decreasing degree of bend in the metal sheet. The image processing means may determine the degree of bend by using a "line of best fit" algorithm calculated from the data derived from the attenuated light falling on some of the pixels. Both the light emitting means and the light receiving means may be respectively mounted on supports on opposing sides of the moveable section of the press. The supports may be respectively adjustable to allow the alignment and position of the emitting and/or receiving means to be adjusted. For example, where the moveable section is a cutting blade or bending tool, blades of different heights can be used, and the position of the emitting means and receiving means will need to be adjusted. Alternatively, only the emitter means need be adjusted, the light receiving means remaining fixed.

Preferably the at least one beam is perpendicular to the relative direction of travel of the tool with respect to the work-piece. More preferably, the at least one beam extends in advance of and parallel to the working tool of a press brake, and more preferably one or more beams includes a planar laser beam, such as is disclosed in Australian patent number 738619.

A further form of the present invention includes a method of operating a combined safety and imaging system for an industrial machine, said machining having a tool and a work piece holding part arranged for relative movement towards one another, said system including a safety device and an imaging device, the method including the steps of:

a) providing an safety mode including a transmitter for transmitting at least one substantially collimated beam of light to a receiver;

b) up to a mute point, halting relative movement of the tool towards the work-piece when an object intersects at least one said beam;

c) at least from said mute point, the system providing an imaging mode whereby the extent of work carried out on said work piece and/or the profile of the tool is determined.

Preferably the safety device is configured to act as the imaging device from the mute point and configured to act as the safety device prior or up to said mute point. Thus the system helps to avoid redundancy or duplication of parts in providing a combined system whereby the safety and imaging components may be commonised.

Preferably, the method further includes the step imaging at least the working part of the tool during at least one calibration operating cycle without the work-piece in position, and thereby establishing calibration image data relating to the tool and machine such that subsequent working operations with the work-piece in place can be imaged and compared to the calibration image data to thereby determine the extent of work carried out on the work-piece from differences between the unworked and worked work-piece.

A further form of the present invention provides a method for determining an extent of work carried out on a work piece by a tool of an industrial machine, including the steps of:

transmitting a collimated beam of light between a light transmitter and a light receiver, illuminating at least a portion of said work piece with said transmitted light, said work piece attenuating at least a portion of said transmitted light, receiving said beam including said attenuated portion, processing said image data to determine from said received beam the extent of work carried out on said work piece by said tool based on said processed image data.

Preferably the receiver includes a pixel matrix, shadow screen and/or camera.

Thereby, for example, the degree of bend of a sheet of metal by a tool of a press brake can be determined from e.g. the "shadow" of the work piece and remaining portion of the beam as received by the pixel matrix.

The system and method may continuously image the work piece, and preferably display a derived image or angle measurement to a user, in order to help monitor in real time the extent of work carried out on the work piece. Thus, should a fault arise, or the work piece be incorrectly worked, or for example, the wrong tool being selected for a predetermined application, this can be detected by the system.

A further aspect of the present invention provides a safety system for halting operation of an industrial machine when at least one light beam is interrupted, the system including progressive muting of an effective protection zone.

Progressive or systematic muting advantageously allows adaptation of the protection zone and/or to allow for enhanced speed control of the tool.

Benefits of the system include, but are not limited to, recognition of interruptions in broad beam (block—rectangular, circular etc.) section beams running parallel to and ahead of the tool tip. It will be appreciated that some of the beam may extend behind the tool tip to provide additional protection from incursion entering from above the tool tip, monitoring stopping distance, monitoring press brake tool high and low speeds, and may be used to assist controlling press brake operating speeds, and can monitor mute point position.

Preferably the system may include at least one transmitter and at least one corresponding receiver arranged to receive light transmitted from said at least one receiver, the machine including first and second portions arranged for relative closing movement during operation of the machine, wherein the system is arranged to restrict or halt further relative closing movement of the first and second portions when an operative portion of said transmitted light received is interrupted, and wherein said at least one receiver includes a plurality of receiver elements, wherein operation of selected said receiver elements are systematically disregarded or muted.

Preferably the safety system may disregard or mute signals from rows of receiver elements. The system may include at least one array of pixels providing said receiver elements.

Preferably the at least one light beam may include a broad or block beam having a two dimensional cross section with a significant depth and thickness, for example on the order of centimeters, e.g., 60 mm×60 mm.

A further aspect of the present invention provides a method of operating a safety system for an industrial machine, including the steps of;

a) Progressively muting portions of a protection zone for a moving tool of the machine.

Preferably the method may include progressively disregarding or muting rows of receiver elements of a receiver.

It will be convenient to further describe the invention by reference to the accompanying drawings which illustrate a possible arrangement of the present invention. Other arrangements of the invention are possible, and consequently the particularity of the accompanying drawing is not to be understood as superseding the generality of the preceding description of the invention.

BRIEF DESCRIPTION OF THE DRAWINGS

FIG. 6 shows a perspective view of an embodiment of the present invention mounted to a press.

FIG. 7 shows a front view of an embodiment of the present invention mounted to a press.

FIG. 8 shows a section view through line A-A of the embodiment shown in FIG. 7.

DESCRIPTION OF PREFERRED EMBODIMENTS

Figure 1:
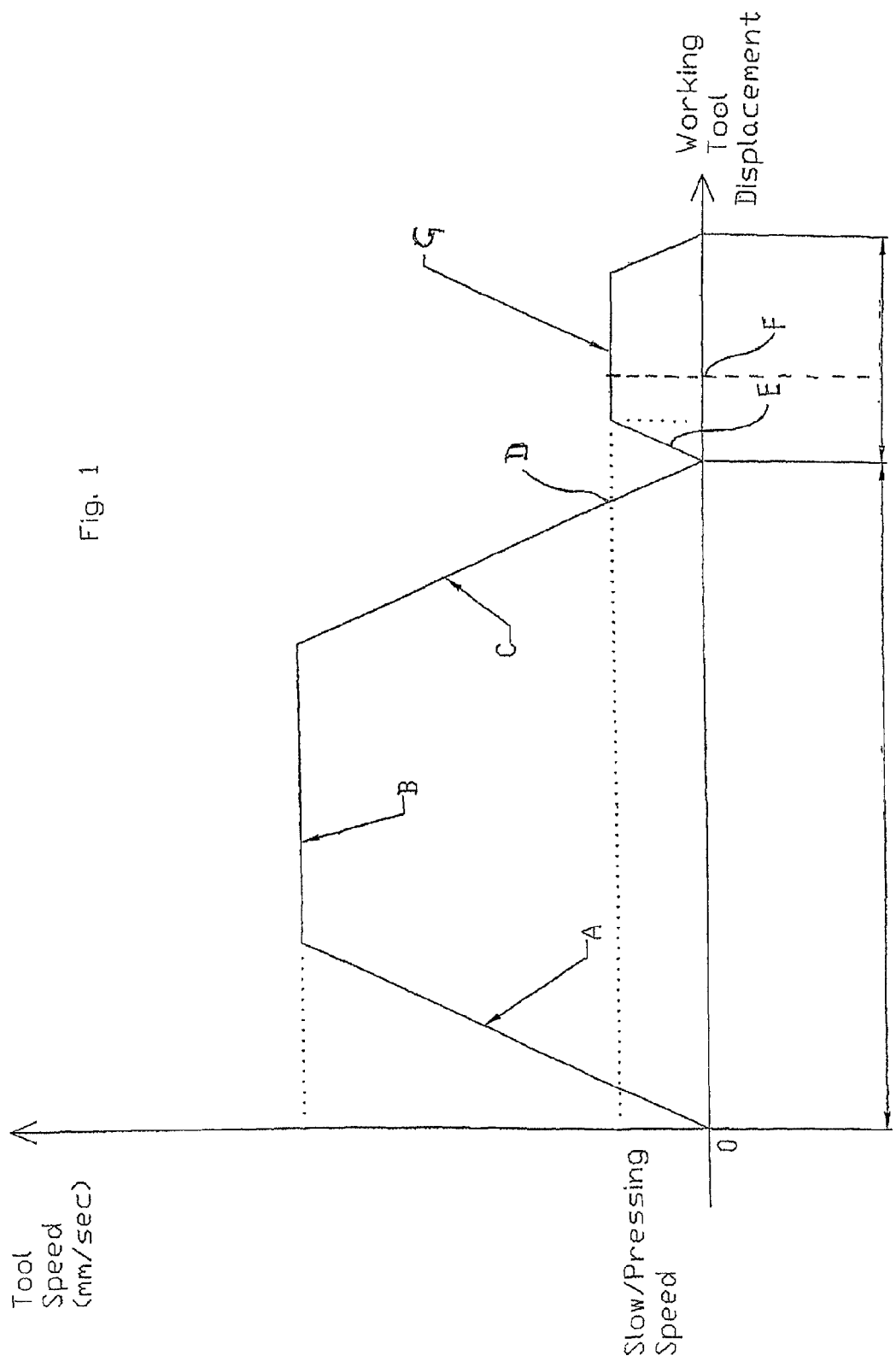
FIG. 1 is a graph of an application of a particular embodiment of the present invention having a combined imaging system and safety system.

Referring initially to FIG. 1, this depicts a graph of velocity (y-axis in millimeter per second) of a tool of an industrial machine against displacement (x-axis) of the tool. In particular, the graph depicted relates to the working tool of a press brake. Section A of the graph shows acceleration of the tool. In this example, a downward stroke of the press is envisaged, though the same principle applies to upstroking machines. It will be appreciated that the present invention may also be applicable to other industrial machines, such as lathes and milling machines. Nominal high speed of the tool is reached (e.g., at approximately 150 mms$^{-1}$), and thereafter plateaus out to a steady velocity shown as Section B. Section C of the graph shows deceleration of the tool to a pressing or crawl speed (e.g., to 10 mms$^{-1}$). In FIG. 1, the tool actually comes to a halt (velocity=zero) where the deceleration line (Section C) meets the displacement x-axis of the graph. In the example discussed and shown, one or more of Sections A-C relate to a sensing mode of the system, and therefore to safety related movements. During movement in Section C, the laser beam is turned on and an object obstructing the beam is detected by the system which causes the tool to halt thereby preventing injury to a user or object intersecting the beam. That is, the system is in safety mode. At a mute point D where the deceleration line of section C crosses the slow/pressing speed (e.g., 10 mms$^{-1}$) velocity axis, the system changes over to an imaging mode according to one or more forms of the present invention, and the safety sensing mode may be switched off. Section E of the graph shows the tool again accelerating up to pressing speed (Section G) for bending the work piece, in this example, bending sheet metal. The point F shows the point of contact of the tool with the material, and subsequently, thereafter, displacement occurs below the top level of the die. Thus, the sheet material is bent, e.g., into a "V" shape, by the tool in pressing the material into the die.

Figure 2:
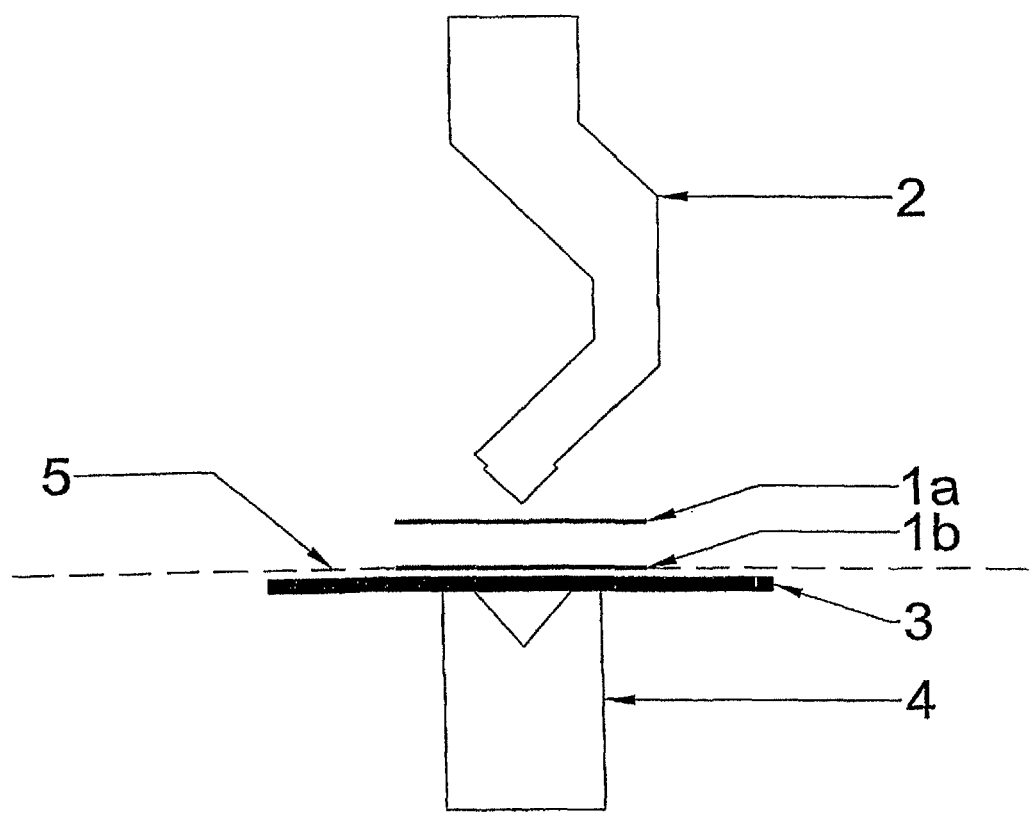
FIG. 2 shows an end view of a system according to an embodiment of the present invention utilizing a twin planar laser beam safety system.

FIG. 2 shows twin planar laser beams 1a, 1b used in a safety system for a press brake, such as are disclosed in Australian patent application number 2003215410, the contents of which are incorporated herein by reference. The twin planar beams 1a and 1b are arranged to descend with, and ahead of, the tool 2 of the press. Interruption of one or both of the beams 1a and 1b prior to a mute point 5 will cause the tool to halt descent. As the leading planar beam 1b reaches the mute point it may be deactivated leaving only planar beam 1a operative. At this stage, imaging of the degree of bend of the sheet material is not activated. As the tool continues to descend, planar beam 1a is switched off when it meets the mute point and the imaging system is switched on.

Figure 3:
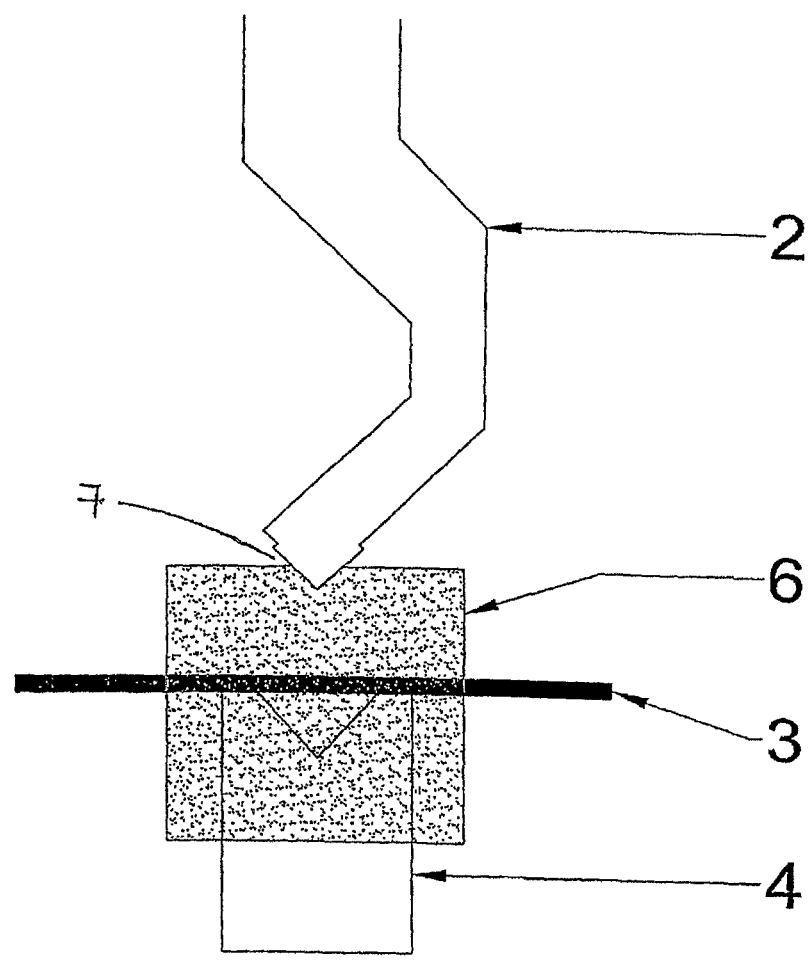
FIG. 3 shows an end view of an embodiment of the imaging system according to the present invention utilized in a press brake for bending sheet metal.

FIG. 3 shows an end view of an expanded light source 6, such as a "block", i.e., broad cross section, laser beam used to illuminate the end of the work piece 3 and/or the tool 2. The use of an expanded light source enables a wider and higher imaging area to be covered compared with individual spot or planar beams. However, it will be appreciated that the broad section imaging area can be produced by multiple smaller section beams collimated such that the beams extend parallel with each other and close together to form an equivalent broad beam. The beam can be set so that the top of the beam detects the tip 7 of the tool at all times. That is, the block laser can travel with the tool in much the same way that the safety laser beams travel with the tool. When the press is activated, the block laser will descend with the tool and detect the die from a distance of approximately 40 mm through to the closed tool. The controller software utilized by the system will be such that the tool will not be permitted to physically touch the die unless otherwise programmed.

Pixel array(s) allow(s) complex patterns or zones to be detected during the safety mode, significantly increasing the level of safety provided. Given the amount of processing required during high speed movement of the tool, only a portion of the pixel array(s) will preferably be utilised e.g., horizontal rows or vertical columns of pixels, or combinations of both. For example, there can be a zone depending on the stopping distance of the machine, for example, 6 mm underneath and up around the forward and rear face of the tool, that if obstructed, causes the tool to halt. There can be a zone on the pixel matrix further away from this initial zone that, if obstructed, triggers a deceleration down to a stop. In addition, there can be a further monitored zone beyond the aforementioned zones that only triggers slow speed if obstructed, and if the obstruction is taken away again full speed is resumed.

Profiles of machine tools and parts to be worked can be recognised by the system, for example, comparing the image object with a library of stored parts or tools. Thereby, protection zones and blanking zones can be automatically adjusted to suit the tools and parts more easily. Thus the top and bottom tool can be imaged to help ensure the top tool and bottom tool (anvil or die) meet correctly. Alternatively or in addition, the form of the part to be created can be stored to ensure that the part being worked takes the expected shape. Any deviation from the expected part shape or expected tool(s) can be detected by the system. The system can therefore adjust the protection areas to suit.

The use of the broad (block) beam allows the angle of depth of the material being worked to be measured on every working action e.g., bending or machining. This enables the machine to incorporate an efficient and simplified measurement system for determining the bend angle or amount of machining whilst limiting capital costs.

Due to the potential arrangement of viewing the end of the material to be worked, material planeness, e.g., deflection of the material being worked outside of required tolerances, can be detected by determining that the image data is a broader spread than expected from a given thickness of material.

It will be appreciated that dimensions of the workpiece may be determined or checked by the imaging system using software.

The portion of the beam that does not illuminate the tool or work piece impinges on an image forming plane in the form of a screen e.g., a shadow screen. An imaging device, such as a digital camera having one or more pixel matrices is used to capture the shadow image created by the pattern of attenuated and un-attenuated light falling on the screen. The captured image is processed to look for differences between a library of stored image or images, or compared to an earlier calibration run where the tool, die and un-worked (or pre-worked) work-piece are imaged in a first pass. An algorithm is used to determine from the captured image, and in comparison with stored data or a previous image, differences between the most recent image and stored data or previous image to thereby determine the angle of bend applied to the material being worked. The system can also detect whether or not the tool is the correct tool for a chosen operation by comparing the imaged tool with a library of tool profile data.

Figure 4:
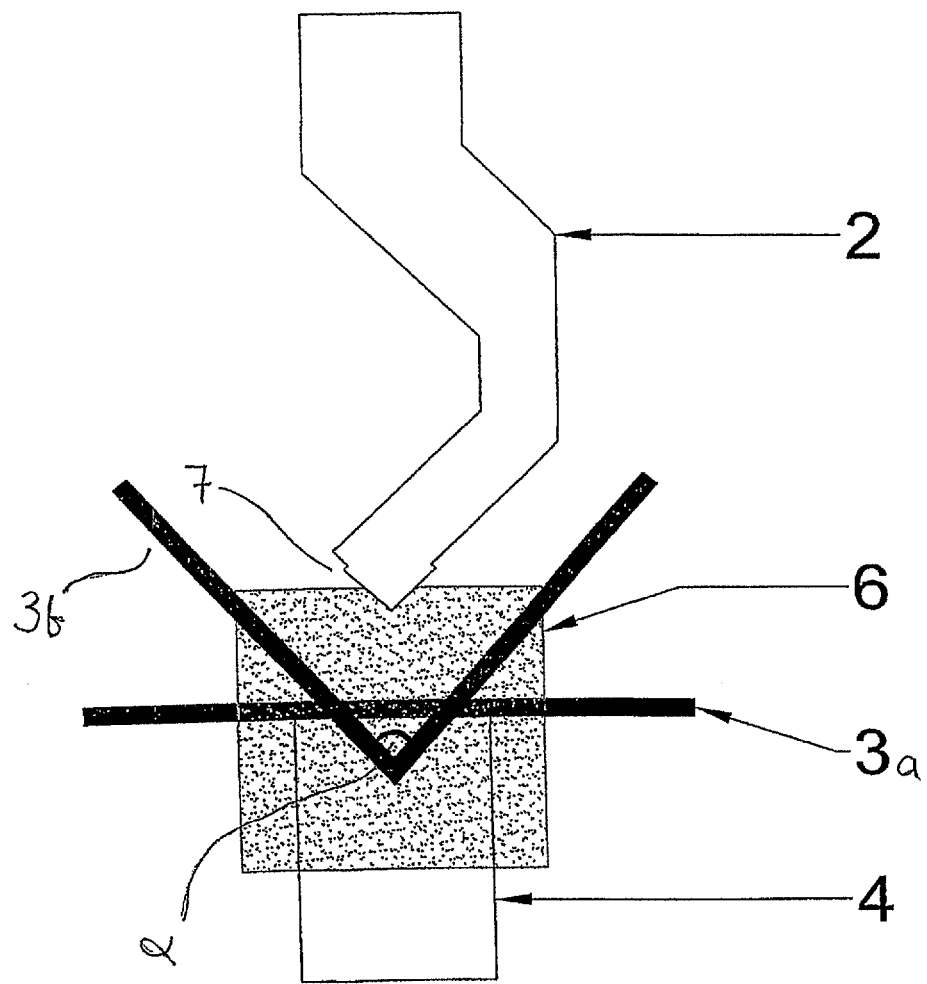
FIG. 4 shows an embodiment of the present invention utilized for imaging the degree of bend of sheet material by a press brake.

FIG. 4 shows an end view of a sheet of metal 3a having been bent 3b in a press brake. The angle of bend a (alpha) is determined by a line of best fit from the data derived from the pattern of the attenuated beam received by the pixel matrix. Errors in the tolerance of the thickness of the material can be determined by the spread of data exceeding the thickness of the material e.g., beyond 3 mm for a 3 mm material. Whilst the system may be used to determine whether the thickness of a material falls within or outside of expected tolerances, the system may also, or alternatively, determine distortion or variation of machining along a further dimension of the work piece, e.g., bend in along a length of sheet of material or distortion of milling or lathe work on a face of a work piece, falling within or outside of required tolerance(s). The further dimension may extend perpendicular to the end on view of the work piece illuminated by the light source, such as the length of a sheet of metal having a V section bend formed along a length thereof with an end of the V section illuminated by the beam. For example, the system can determine whether a bend formed along a length of sheet metal by a press brake falls within expected tolerances, such that the imaging system can check for distortion, e.g., ripples or waves and the work piece rejected or reworked, and/or the machine adjusted or repaired, if data is found to fall outside of required tolerances. Thus, the imaging system can "look along" a linear dimension of the material to check whether the machining operation e.g., bend imposed by a press brake on sheet metal, is within tolerances along that length of material. Preferably the resolution of the pixel matrix is 640×480 pixels, thereby allowing suitably precise measurements of the work piece and/or machine parts. It is envisaged that a "first pass" would be carried out in order to image the tool and the die in the absence of the material to be worked, and thereafter a comparison can be made with the material in place to look for differences between the initial "first pass" image and the subsequent "worked" image. The comparison can be made by storing the "first pass" image in an initial block of memory whereby the image processing means can compare the subsequent image or images with the initial memory. In addition, the profile of the tool tip and/or the die can be imaged in order to help avoid clashing of the working tool tip with the die should an incorrect tool tip or die be chosen. The tool and/or die can be compared to a library of tools and dies and therefore checked to ensure that the correct tool and/or die is selected for a chosen working operation.

Figure 5:
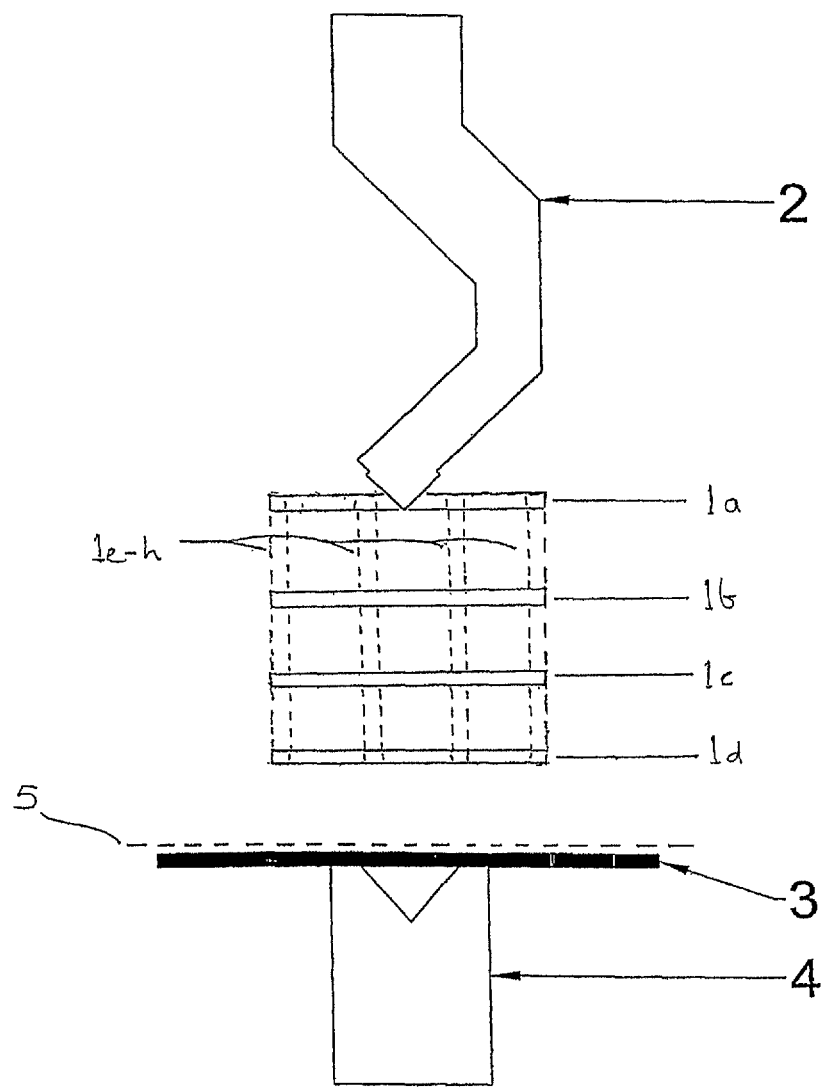
FIG. 5 shows a further embodiment of the present invention wherein an expanded light source is divided into multiple planar laser beams.

FIG. 5 shows multiple receiving sections of the receiver, either horizontally disposed 1a-d, vertically disposed 1e-h, or a combination of both. It will be appreciated that more or less multiple receiving sections may be used, and in varying patterns, e.g., they need not be horizontal and/or vertical sections. Due to relatively high speed of the tool during the safety mode i.e., prior to the mute point 5, the receiver may be unable to process the large quantity of information sufficiently quick if an entire receiver matrix or array used. Because of the large number of pixels in a completely active array, receiving all or a substantial proportion of the block laser beam during safety mode can result in an overload of information to be processed at high speed during operation of the machine. Therefore the matrix or array can be divided up into active receiving sections as shown. That is, sections of the receiver may not necessarily be utilised during safety mode but activated during the imaging mode. Alternatively or in addition, the block laser can be divided up into transmitting sections for receipt by the receiver in safety mode. The full or substantial proportion of the block laser can then be utilised during imaging mode. As each section of the beam approaches the mute point, the respective receiving section is deactivated. When the last beam section reaches the mute point, or shortly before tool tip reaches the mute point, the system switches over to imaging mode and the safety mode is deactivated. The tool and/or work piece are then imaged to determine the degree of work carried out on the work piece or that the tool is as specified.

FIG. 6 shows a perspective view of a particular embodiment of the present invention. A light source 26 and receiver 28 are shown in alignment with one another and mounted to a press 20 for travel in the direction of movement of a working tool 22 of the press. Thus, the light source and receiver travel with the tool (vertically upwards and downwards), with the light beam 30 from the light source being directed towards the receiver. The light beam 30 is of broad 2-D or "block beam" cross section sufficient to illuminate a useful portion of an end of a work piece 32 in position on the die or anvil 24. The work piece is shown partly worked in already having a V section bend. In this embodiment the remainder of the beam un-attenuated by the work piece and/or tool is received directly by the receiver 28. The receiver incorporates a lens arrangement, as in a camera, to focus the overall size of the captured image onto a CCD of a digital camera. The image is processed and can be output to a screen for viewing to check for obvious errors in the work piece or tool alignment, and/or used to determine numerical values to show correctness/errors in the work piece e.g., for display by a monitor of a CNC press, and/or compared to a library of expected images. In addition or alternatively, image data can be compared and/or checked by software, which software may be in communication with or incorporated into the processing means.

FIG. 7 shows a front view of the press 20, similar to that shown in FIGS. 6 and 8, with the light source 26 and receiver 28. In this embodiment, the imaging mode light beam 30 illuminates an end of the work piece 32 and tool 22, such that the work piece and tool are imaged onto a screen 34 as shadows along with the remainder of the light beam. The receiver then determines the image from the shadow image created on the screen 34. The degree of bend imposed on the work-piece, and/or the amount of distortion along the length or width of the work-piece, is then determined e.g., by a line of best fit method comparing the captured image with an expected image. As depicted, the screen 34 is mounted to travel with, and form part of, the overall light beam receiver 28. The screen may be moved out of the path of the light beam 30 when the system is in safety mode and moved into the path of the light beam for imaging mode.

FIG. 8 shows a cross section taken through line A-A of the system and machine of FIG. 7. The broad 2-D cross section "block beam" beam 30 can be seen with the tip of the tool 22 impinging into the beam. As the tool travels downwards, the work piece 32 (and tool) will intersect the beam. When the tool travels upwards, the system can change over to a safety mode (preferably at the mute point, whereby incursion of an object into the beam causes the machine to halt further movement.

Figure 9:
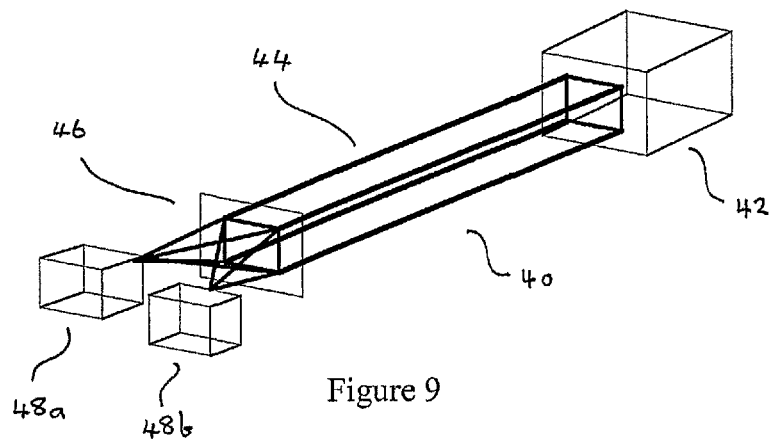
FIG. 9 shows a perspective view of a block laser safety and/or imaging system according to an embodiment of the present invention.

FIG. 9 shows a broad (block) beam safety system and/or imaging system 40. A transmitter 42 transmits a broad beam 44 which is received at a screen 46, such as a shadow screen. It will be appreciated that the drawing shows the full cross section of the beam falling on the screen. However, in use, a workpiece and/or tool may interpose at least in part between the transmitter and screen, thereby attenuating at least a portion of the beam falling on the tool/workpiece to create a shadow image at the screen. The resultant screen image is imaged by multiple cameras 48a, 48b. At least one camera may be a CMOS camera, which may have a resolution sufficient to image a 60 mm×50 mm or 60 mm by 60 mm cross section beam. The camera(s) may be fixed focus cameras imaging from the screen.

The imaging system can be used to identify the tool tip, e.g., for calibration of a commencement of a working stroke or cycle, such as at the top of a downward stroke of a press brake. Such imaging can be used to identify the position of the tool tip at the commencement of a stroke and therefore, where the position of the tool tip is known and the distance needed to stop is known, the position, size and/or shape of the protection zone can be determined.

The relatively large area of the block or multiple light sources can be progressively muted e.g. muting the effect of rows of pixels, or group of pixels, in the vertical plane the protection area as the tool (with the protection area) approaches and goes through the mute point. For example, for a receiver including an array of pixels, an output signal for successive rows of the pixels can be progressively muted as or immediately before a corresponding portion passes through the mute point.

A second camera 48a, such as a low speed high resolution camera, can be provided. This can provide 1280×960 (or higher) pixel array images of the tool and workpiece.

An image processing module can be connected to the receiver circuit for comparing tool images with information transferred from the CNC tool library. This verifies that the image of the workpiece is consistent with the bend information and various angle checking functions (which can also be integrated into the press brake numerical control NC.

Figures 10A, 10B, 10C, 10D:
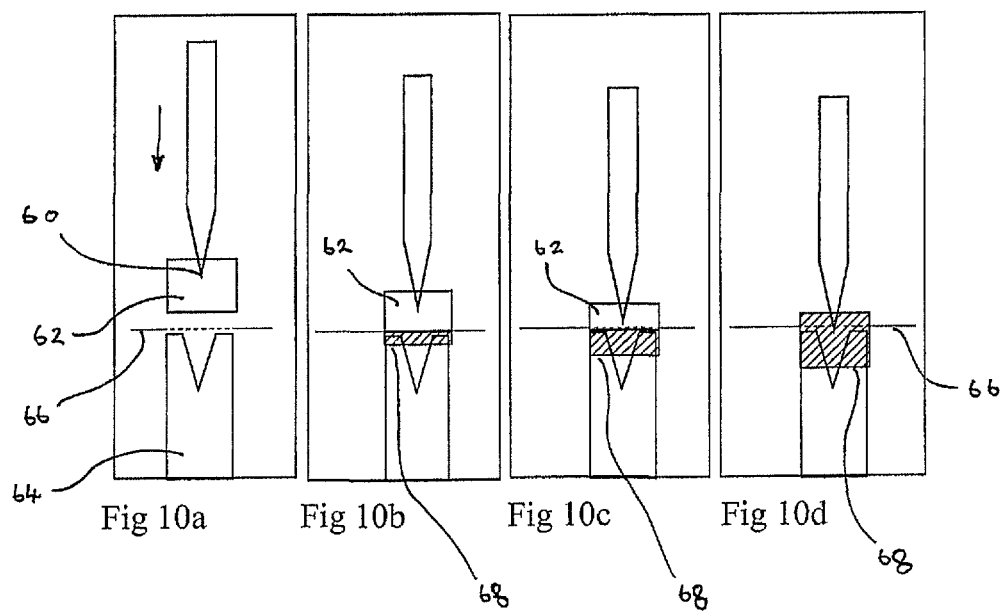
FIGS. 10a to 10d show successive stages during progressive muting of a block laser according to an embodiment of the present invention.

FIGS. 10a to 10d show successive stages during a progressive muting phase. FIG. 10a shows the end of the tool tip 60 protected by a protection zone 62. The tool tip and monitored zone travel downwards towards a workpiece (not shown) on a die 64. A mute point 66 is defined to be a predetermined distance above the die and workpiece.

As the tool tip travels downward (see FIGS. 10b and 10c), the protection zone is progressively muted (hatched area) from the mute point 66 such that the leading portion 68 of the protection zone (in this example the lowermost portion) becomes ineffective. This can be achieved by progressively muting or disregarding output signals from successive or staged rows of elements in a receiver (not shown). It will be appreciated that the elements need not be deactivated, rather, their outputs may be disregarded for the purposes of a safety system but may still be used for an imaging system. Thus, the beam may continue to illuminate the receiver (attenuated or not) and be utilised for imaging but progressively muted for the purposes of a safety (halting) system. FIG. 10d shows the tool tip passing through the mute point. Therefore the entire beam is muted due to the tool tip being so close to the mute point that protection is considered unnecessary or ineffectual (the machine being unable to stop within the remaining closing distance to the workpiece.

The mute point can be a point established, a measured distance (say approx 2-3 mm), above the surface of the material to be worked, e.g., bent. This provides benefits of:

1. Extra safety. Protection from when the bottom of the protection zone touches the mute point all the way through to when the last part of the zone mutes. This last line of protection (as per basic diagram) can be after the tool tip is entering the bottom die. This provides a substantial gain in safety.
2. As particular rows of protection are muted, this can separate signals to progressively slow down, and/or control the descent of the top tool. Therefore the available protection under the tool tip (as it reduces) can be matched to the speed (and therefore stopping distances) the machine is allowed to travel at.
3. Because the protection is being carried on down—as per point 1—the tool tip can be touching the material to be bent before the tool needs to change to slow bending speed (typically 10 mm/sec). Therefore no safety speed (also 10 mm/sec) needs to be activated before the tool arrives at the material. In previous systems—such as single laser systems, when the protection is muted the tool must be traveling at the required safe speed (10 mm/sec).

Points 2 and 3 recognise improvements in the cycle time of the stroke and therefore more bends in less time, while also gaining in safety.

The imaging system may be used to identify a profile of the working tool, and the tool can be checked for correctness e.g., against a library of known tools. Also, the tool may be imaged to determine a required mute point from the tip of the tool.

What is claimed is:

1. A system comprising:
    at least one light transmitter,
    at least one corresponding light receiver including a plurality of receiver elements configured and arranged to receive light transmitted from said at least one light transmitter,
    a machine including first and second portions arranged for relative closing movement during operation of the machine, and wherein the system is configured and arranged to restrict or halt further relative closing movement of the first and second portions when the light transmitted to an operative proportion of said plurality of light receiver elements is interrupted, and
    wherein a safety operation of selected ones of said plurality of light receiver elements is progressively disregarded or muted for an increasing number of the light receiver elements as the first and second portions of the machine close relative to one another.

2. The system as claimed in claim 1, wherein the system progressively disregards or mutes the safety effect of signals from rows or groups of said light receiver elements.

3. The system as claimed in claim 1, wherein the at least one light receiver includes at least one array of pixels providing said plurality of light receiver elements.

4. The system as claimed in claim 1, wherein the safety operation is disregarded from a mute point for progressive numbers of the receiver elements as the first and second portions close relative to one another.

5. The system as claimed in claim 1, wherein the light receiver includes a high resolution camera.

6. The system as claimed in claim 5, wherein the camera provides a pixel array used for imaging a workpiece to be worked by a tool of one of the first and second portions.

7. A method of operating a combined safety and imaging system for an industrial machine, said machine having first and second members arranged for relative movement, the first member including a tool holding portion and the second member including a workpiece holding portion, and said machine including at least one transmitter for transmitting at least one beam of light to at least one receiver; the method including the steps of:
    operating the system in a safety mode whereby interruption of at least a portion of said at least one beam results in halting of said relative movement; and
    operating the system in an imaging mode wherein at least a portion of a tool and/or workpiece is imaged, or an extent of work carried out on said workpiece and/or a profile of the tool is determined.

8. The method as claimed in claim 7, wherein the system is configured to act as an imaging device from a predetermined point or approach distance relative to a workpiece.

9. The method as claimed in claim 7, including the step of switching the system from the safety mode to the imaging mode at a predetermined point or action.

10. The method as claimed in claim 8, wherein the predetermined point is a mute point where the safety system becomes inactive from that point.

11. The method as claimed in claim 9, wherein the predetermined point is a mute point where the safety system becomes inactive from that point.

12. A method of operating a safety system for an industrial machine, including the step of progressively muting or disregarding the effect of portions of a protection zone for a moving tool of the machine.

13. A method as claimed in claim 12, wherein
    the industrial machine is a press, and
    the method includes progressively disregarding or muting a safety operation of rows or groups of receiver elements of a light receiver from a predetermined approach distance relative to a workpiece held by the press.

14. The system of claim 1, wherein the machine includes one of the following: a press brake, a bending machine, a forming machine, an industrial press, a lathe, and a milling machine.

15. The system of claim 1, wherein the machine is a press brake, the first portion is an anvil, and the second portion is a blade.

16. The system of claim 1, wherein
    the first portion of the machine includes a tool-holding portion configured and arranged to hold a tool,
    the second portion of the machine includes a work-piece holding portion configured and arranged to hold a workpiece, and
    the machine is configured and arranged to engage a tool held by the tool-holding portion with a workpiece held by the work-piece holding portion by moving the tool and workpiece relative to one another.

17. The system of claim 1, wherein the system is configured and arranged to
    mute ones of the light receiver elements to which light transmission is blocked by the first or second portions of the machine as the closing movement positions one or both of the first and second portions in a path of the light transmission, and
    restrict or halt the further relative closing movement of the first and second portions in response to light transmitted to a portion of the light receiver elements being interrupted for other ones of the light receiver elements that are not muted.

18. The method of claim 7, wherein the industrial machine includes one of the following: a press brake, a bending machine, a forming machine, an industrial press, a lathe, and a milling machine.

19. The method of claim 7, wherein the machine is a press brake, the first member is a blade, and the second member is an anvil, and wherein the step of operating the system in the safety mode includes deforming the workpiece by moving the blade toward the anvil and engaging the blade with the workpiece.

20. The method of claim 7, wherein
    the first member of the machine includes a tool-holding portion configured and arranged to hold the tool,
    the second member of the machine includes a workpiece holding portion configured and arranged to hold the workpiece, and
    the step of operating the system in the safety mode includes operating the machine with the at least one transmitter and the at least one transmitter to halt movement of the tool relative to the workpiece in response to interruption of the at least a portion of said at least one beam.

* * * * *